Dec. 1, 1964  R. R. SECUNDE ETAL  3,159,767
VOLTAGE SENSING AND OVERVOLTAGE INDICATING CIRCUIT
Filed May 4, 1960
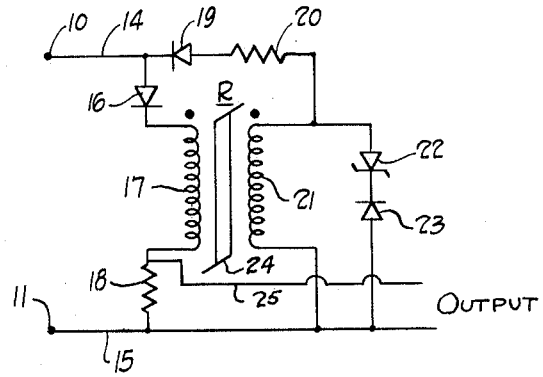
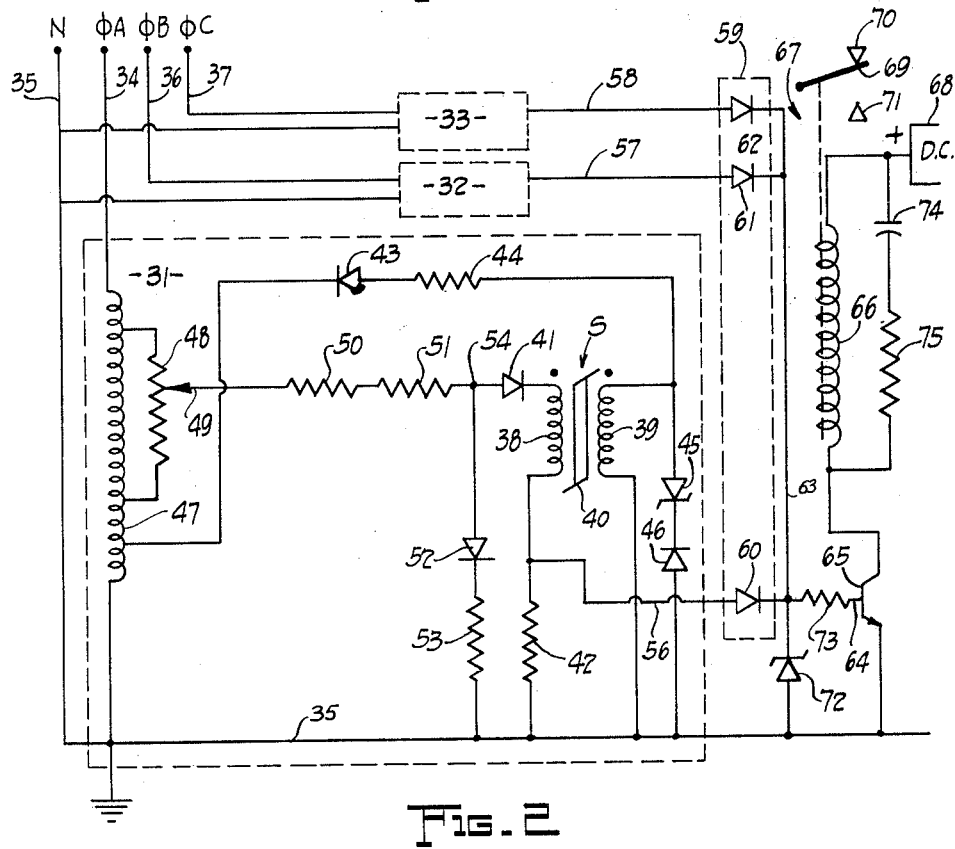
INVENTORS
RICHARD R. SECUNDE
CHARLES H. GRACE
BY
ATTORNEYS.

3,159,767
VOLTAGE SENSING AND OVERVOLTAGE INDICATING CIRCUIT

Richard R. Secunde, Cleveland, and Charles H. Grace, Brecksville, Ohio, assignors, by mesne assignments, to Lear Siegler, Inc.
Filed May 4, 1960, Ser. No. 26,756
7 Claims. (Cl. 317—31)

This invention relates to a sensing and indicating circuit for an alternating current power system and particularly to an overvoltage protection circuit for producing a characteristic signal in response to a sensed overvoltage in the alternating current system.

The circuit of this invention is useful, for example, in connection with the detection of overvoltage conditions in alternating current power systems for aircraft. In such systems, malfunction of a generator or voltage regulator and transient conditions which cause high voltage in the system can result in damage to system components and equipment supplied by the system if the overvoltage is allowed to exist beyond a period of time that is dependent upon the magnitude of the voltage, the properties of the system components affected and the equipment supplied. Such damage can be prevented or minimized through timely isolation of the affected areas of the system or de-energization of the power generating equipment.

It is a general object of this invention, therefore, to provide means for protecting alternating current power systems and equipment from damaging high voltages by sensing such voltages and producing a signal in response thereto that may be used to accomplish functions designed to prevent or limit damage to the system and equipment.

Damage due to an overvoltage is a function of both the magnitude and the duration of the overvoltage. As a general rule, the magnitude of overvoltage that system components or equipment supplied by the system can withstand without damage thereto decreases as the duration of the overvoltage condition grows longer. Another object, therefore, is to provide a circuit which produces a characteristic output signal delayed in time after the occurrence of the sensed overvoltage condition for a period inversely proportional to the magnitude of the overvoltage.

A further object is to provide an overvoltage protection circuit that is sensitive to the volt-second content or the average value of one half-cycle of the voltage being sensed. It, therefore, approximately measures the r.m.s. value of the applied voltage and its performance is not appreciably affected by distorted voltage wave shapes as are peak sensing circuits. Under transient overvoltage conditions, the circuit integrates the transient overvoltage envelope and produces an output signal only if the total energy indicated by the volt-seconds in that envelope is likely to cause damage to the system or equipment.

Other objects are to provide a stable and reliable overvoltage protection circuit made up entirely of static components to provide a circuit that operates substantially independently of wide temperature variation and to provide a circuit that operates substantially independently of variations in the frequency of sensed system voltage.

Briefly, we accomplish these objects by the use of a saturable core reactor arranged so that the flux therein is driven in one direction an amount proportional to the average value of a sensed half-cycle of system voltage and so that the flux is driven in the opposite direction, i.e., reset, a predetermined amount during the next i.e., resetting, half-cycle of system voltage following the sensed half-cycle. The circuit is further arranged so that a characteristic output signal is produced when the sum of any net changes in the flux level in the core produced by the successive sensing and resetting half-cycles places the core in a condition of saturation. The result of this manner of operation is that the output signal is delayed in time an amount that is a function of the relative magnitude of the voltages of the sensed and resetting half-cycles.

Other objects and advantages of our invention will appear from the following description of preferred forms of our invention, reference being had to the accompanying drawings in which:

FIGURE 1 is a diagram of a single phase sensing and indicating circuit; and

FIGURE 2 is a diagram showing the circuit of FIGURE 1 adapted to provide overvoltage protection for a polyphase alternating current system.

In the single phase sensing and indicating circuit shown in FIGURE 1, the voltage to be sensed by the circuit is applied to input terminals 10 and 11. Connected between input terminals 10 and 11 by means of conductors 14 and 15 is a first series combination of elements comprising a unidirectional impedance device that preferably takes the form of a diode rectifier 16, a sensing winding 17 of a saturable core reactor R and an output impedance 18. Diode rectifier 16 is connected so that current will pass through the series combination including sensing winding 17 and output impedance 18 when input terminal 10 is positive with respect to input terminal 11; this condition is hereinafter referred to as the positive half-cycle of the sensed voltage, and the energization of winding 17 during positive half cycles tends to drive the core of reactor R to a state that is referred to herein as positive saturation.

Also connected between input terminals 10 and 11 by means of conductors 14 and 15 is a second series combination comprising a unidirectional impedance device that preferably takes the form of a diode rectifier 19, a current limiting impedance 20 and a resetting winding 21 of saturable reactor R. Diode, rectifier 19 is connected so that current passes through resetting winding 21 when input terminal 11 is positive with respect to input terminal 10; this condition is hereinafter referred to as the negative half-cycle of the sensed voltage and the energization of winding 21 tends to drive the core of the reactor to a state that is referred to herein as negative saturation. The remainder of the circuit consists of a voltage reference impedance such as a Zener diode 22 and a unidirectional impedance device such as diode rectifier 23 connected in parallel with resetting winding 21. Zener diode 22 is poled oppositely from diode rectifier 19 so that during negative half-cycles of sensed voltage, inverse voltage is applied to Zener diode 22 and forward voltage is applied to diode rectifier 23.

It will be noted that when alternating current is applied to input terminals, diode rectifiers 16 and 19 function to alternately permit and block the flow of successive half-cycles of applied alternating current through the sensing winding 17 and resetting winding 21. It is obvious that rectifiers 16, 19 and 23 and Zener diode 22 may all be poled in directions opposite from those shown in FIGURE 1 without changing the operation of the circuit or departing from the teachings of our invention.

The saturable core 24 of saturable reactor R is composed of square hysteresis loop material and provides a single flux path. Sensing winding 17 and resetting winding 21 are wound on core 24 and both link the single flux path provided thereby.

In the following description of the operation of this circuit, it is assumed that core 24 is initially at a condition of negative saturation. At the start of a positive half-cycle of voltage to be sensed applied to input terminals 10 and 11, diode rectifier 16 conducts and diode rectifiers 19 and 23 block. The properties of saturable core 24 and the design of sensing winding 17 are such that core 24 ordinarily is driven from negative saturation toward positive saturation a fraction of the total flux difference between positive and negative saturation during this positive half-cycle, the volt-seconds contained in the positive half-cycle of sensed voltage ordinarily being insufficient to drive the core 24 from negative saturation to positive saturation. During the succeeding negative half-cycle of sensed voltage, diode rectifiers 19 and 23 conduct and diode rectifier 16 blocks. The voltage across resetting winding 21 increases until the avalanche or break-down voltage of Zener diode 22 is reached; at this time and for the remainder of the negative half-cycle, the voltage across resetting winding 21 is limited to a voltage no greater than the break-down voltage of Zener diode 22. Voltage in excess of that appearing across resetting winding 21 is absorbed by impedance 20. Thus, during the negative half-cycle of sensed voltage, a voltage of essentially constant magnitude as determined by Zener diode 22 is applied to resetting winding 21, the flux in saturable core 24 is driven a predetermined amount toward negative saturation and this amount remains substantially constant regardless of increases in the sensed voltage.

The saturable reactor and associated circuits are designed so that when the sensed voltage is less than a predetermined minimum voltage above which it is desired to produce an output signal, hereinafter referred to as the minimum trip level, the change in flux produced by the negative half-cycle of sensed voltage is greater than the change in flux produced by the positive half-cycle of sensed voltage. This may be accomplished, for example, by making the winding 21 with more turns than the winding 17, or by the use of a voltage divider circuit as described below in connection with FIGURE 2. Because of this characteristic of the reactor, when the sensed voltage is below the minimum trip level, core 24 is at negative saturation at the start of each positive half-cycle. So long as core 24 is not in a condition of positive saturation, only magnetizing current flows through sensing winding 17 and output impedance 18; this small current produces only a slight voltage drop across output impedance 18. Under these conditions, the output voltage, which appears between conductor 15 and a conductor 25 that is connected at the opposite end of output resistor 18, is insufficient to operate the control circuits.

Assuming now that the sensed voltage increases to a point above the minimum trip level, core 24 is then driven toward positive saturation during the positive half-cycle a greater amount than it is driven toward negative saturation during the negative half-cycle, thereby producing a net shift toward positive saturation in the flux level of the core. After a number of cycles of sensed voltage that exceed the minimum trip level, the sum of the net positive shifts in the flux level in core 24 drives core 24 to positive saturation. When this occurs, a current that is large relative to the magnetizing current flows in sensing winding 17 during the latter part of each positive half-cycle, producing voltage peaks across output impedance 18. These voltage peaks reach much greater values than any voltage drops developed across output impedance 18 by magnetizing current flowing therethrough. The voltage peaks thus produced appear between conductors 15 and 25 and constitute a characteristic output signal which occurs only when the magnitude of the sensed voltage has exceeded the minimum trip level for a predetermined period of time.

The time delay between the occurrence of a sensed overvoltage and the occurrence of the characteristic output signal is directly related to the amount by which the overvoltage exceeds the minimum trip level. This is so because the magnitude of the net positive shift in the level of core flux with each complete cycle of sensed overvoltage increases directly with the amount by which the sensed voltage exceeds the minimum trip level. Therefore, as the overvoltage increases, the net shift in the flux level toward positive saturation during each complete cycle increases and fewer complete cycles are required to drive core 24 from negative to positive saturation than would be required with a smaller overvoltage. Since the voltage peaks across output impedance 18 or the characteristic output signals first occur when the flux level of the core reaches positive saturation, it is apparent that the output signal is delayed in time after the sensing of an overvoltage by an amount inversely proportional to the magnitude of the overvoltage.

For a given overvoltage, the time that the output signal is delayed after the occurrence of the overvoltage is substantially independent of the frequency of the alternating current voltage sensed by the circuit. The reason for this is that the ratio of positive flux change per cycle to negative flux change per cycle is not substantially affected by changes in frequency while the magnitude of the changes for a given voltage varies substantially inversely with the frequency. For example, if the frequency of the sensed alternating current increases, the magnitude of the negative and positive flux changes per cycle both become smaller but are still related to each other by a constant ratio; and while each cycle results in a smaller net increase in the core flux level during an overvoltage condition, the number of cycles per unit of time increases sufficiently to maintain the time delay substantially constant.

The sensitivity of overvoltage detecting devices embodying the present invention is increased because the circuit has an inherent ability to avalanche slightly when the reactor core reaches positive saturation. This ability exists because more energy is required to drive the core out of saturation than into saturation; also, the impedance of the circuit supplying energy to resetting winding 21 is relatively high and the voltage drop across winding 21 expends some of the volt-seconds that would otherwise be available to drive the flux level of the core in the negative direction. As a consequence of this avalanche quality, when the reactor once reaches saturation, it is driven into saturation earlier during succeeding positive half-cycles of sensed overvoltage, even though the sensed voltage does not increase thereby tending to enlarge the voltage peaks developed across output impedance 18.

After an overvoltage has been sensed by the circuit and the characteristic output signal has functioned through suitable circuitry to reduce the overvoltage, the circuit automatically resets, and the core 24 is returned to a condition of negative saturation in a relatively small number of cycles.

FIGURE 2 illustrates an adaptation of the overvoltage protection circuit of FIGURE 1 to a three phase alternating current system; FIGURE 2 also shows an output circuit adapted to operate a relay having contacts which may be connected to additional circuitry to de-energize the system generator or perform any other desired function.

The circuit shown in FIGURE 2 comprises three single phase overvoltage sensing and indicating circuits indicated generally by boxes 31, 32 and 33; each is similar to the circuit of FIGURE 1. Sensing circuit 31 is connected across phase A line 34 and neutral 35, sensing circuit 32 is connected across phase B line 36 and neutral 35, and sensing circuit 33 is connected across phase C line 37 and neutral 35. The three sensing circuits 31, 32 and 33 are thus arranged so that each senses one of the line-to-neutral voltages of the system. These circuits are alike; therefore only circuit 31 is described and shown in detail.

Sensing circuit 31 comprises a saturable reactor S having a sensing winding 38 and a resetting winding 39 wound on a single core 40 made of substantially square hysteresis loop material. Sensing winding 38 is connected in series with a unidirectional impedance or rectifier diode 41 and an output impedance 42. Resetting winding 39 is in series combination with a unidirectional impedance or rectifier diode 43 and a current limiting resistance 44. A voltage reference or Zener diode 45 and a unidirectional impedance or rectifier diode 46 in series are connected in parallel with resetting winding 39. This portion of the circuit 31 is similar to the circuit of FIGURE 1 in arrangement and principle of operation.

In order to provide an input to sensing circuit 31 that is proportional to the phase A-to-neutral voltage of the system, an autotransformer 47 having a number of voltage taps is connected between line 34 and neutral 35. A voltage proportional to the phase A-to-neutral voltage is supplied to sensing winding 38 by means of a voltage divider comprising potentiometer 48 connected between two voltage taps of autotransformer 47 and having a movable contact 49 connected to the series combination made up of a positive temperature coefficient resistance 50, a resistance 51, a unidirectional impedance or rectifier diode 52 and a resistance 53. Sensing winding 38 and its associated diode 41 and load impedance 42 are connected between neutral 35 and point 54 between resistor 51 and diode 52. Diode 41, associated with sensing winding 38 and diode 52, are both poled to pass the same polarity half-cycles of sensed voltage and to block half-cycles of the opposite polarity of sensed voltage in the sensing winding.

Power for the resetting circuit is provided from another voltage tap of autotransformer 47. Thus the voltage applied to sensing winding 38 is proportional to the phase A-to-neutral voltage of the system and the voltage applied to the resetting winding 39 is substantially fixed, and in proper phase relationship to the voltage applied to winding 38. The ratio between these voltages can be varied by adjusting contact 49 of potentiometer 48, thus adjusting the minimum trip value of the circuit. The positive temperature coefficient resistance 50 in the input circuit to sensing winding 38 provides compensation for temperature-dependent changes in the breakdown voltage of Zener diode 45 and changes in other circuit values. Since sensing circuits 32 and 33 are identical to circuit 31, the minimum trip level of these circuits can also be adjusted by means of potentiometers similar to potentiometer 48. The time delay-vs.-overvoltage characteristic of each of the circuits is fixed, and determined, by the design values for the circuit components.

The operation of sensing circuit 31, as well as circuits 32 and 33, is basically the same as described above with respect to FIGURE 1. So long as the predetermined trip voltage is not exceeded for the period of time required by the circuit, the voltage appearing across output resistor 42 is relatively very small; if the core 40 becomes saturated in response to overvoltage in phase A of sufficient magnitude and duration, signal voltage peaks appear across resistor 42; similar signal voltages appear across the corresponding output resistors of sensing circuits 32 and 33 in the event of such overvoltages in phases B and C.

In order to make use of the output signals in effecting control of an instrumentability such as a generator, for example, sensing circuits 31, 32 and 33 are provided with output conductors 56, 57 and 58, respectively; these, as shown in the case of conductor 56, are connected to their respective sensing circuits between the sensing winding and the output impedance. The outputs of conductors 56, 57 and 58 of subcircuits 31, 32 and 33, respectively, are combined in an "OR" circuit generally indicated by 59 and comprising three unidirectional impedances or rectifier diodes 60, 61 and 62 connected in a conventional "OR" circuit arrangement to provide a common output at conductor 63.

Conductor 63 carrying the output signals from "OR" circuit 59 is connected to the base 64 of a NPN transistor 65 through a series resistance 73. The emitter-collector circuit of transistor 65 is in series circuit relationship with winding 66 of relay 67, all connected between a D.C. source 68 and neutral 35. Relay 67 may be of conventional construction having, for example, an armature 69 and a pair of contacts 70 and 71 to which may be connected suitable circuitry for accomplishing desired functions. Zener diode 72, connected between output conductor 63 and neutral 35, limits the amplitude of the voltage peaks applied to base 64 of transistor 65 and resistance 73 in series with base 64 limits the base current to a safe level. A capacitor 74 and resistance 75, connected in series across winding 66 of relay 67, filter the voltage across relay winding 66 and limit the collector current of transistor 65.

When the line-to-neutral voltage of any one phase of the system exceeds the predetermined minimum trip value by a sufficient amount and for a sufficient length of time, the sensing and indicating circuit associated with that phase produces a characteristic output signal in the output conductor 56, 57 or 58 for that phase. The output signal is directed by "OR" circuit 59 to base 64 of transistor 65 and turns on transistor 65 for a sufficient length of time to pick up relay 67. Voltages developed across the output impedances of the sensing circuits by magnetizing current flowing in sensing windings 38 when cores 40 are unsaturated are not sufficient to overcome the forward voltage drop of the base-emitter junction of transistor 65. Therefore, transistor 65 remains "off" and relay 67 remains de-energized until a characteristic output signal is applied to base 64 from one of the three sensing and indicating circuits 31, 32, and 33.

Sensing and indicating circuits 31, 32 and 33, like the circuit in FIGURE 1, each have an inherent ability to avalanche slightly, providing a latching characteristic to their operation. Also like the circuit of FIGURE 1, sensing circuits 31, 32 and 33 are sensitive to the average value of one half-cycle of the voltage being measured, and therefore, their performances are not appreciably effected by distorted wave shapes. Under transient overvoltage conditions, each sensing circuit integrates the transient overvoltage envelope of its respective phase and produces a characteristic output signal or voltage peak sufficient to operate the output relay if the total energy indicated by the volt-seconds in that envelope exceeds a predetermined limit. For the reasons stated in connection with the circuit of FIGURE 1, the time delay between the occurrence of an overvoltage condition in one of the system phases and the time at which relay 67 is energized is inversely proportional to the magnitude of the overvoltage and this inverse time delay is substantially independent of frequency variations.

After an overvoltage has been sensed and output relay 67 has been energized to effect proper isolating action, the overvoltage circuit is automatically reset when the value of the input voltage falls to some level below the minimum trip level. Resetting automatically occurs only when the input voltage is low enough so that the difference between volt-seconds applied to the sensing windings 38, and the substantially fixed or constant volt-seconds applied to reset windings 39 is great enough, in the direction causing flux to be driven toward negative saturation, to overcome the avalanche quality of the saturable reactor. If input voltage is completely removed from the circuit after the circuit has functioned and isolation has taken place, reset will not occur and a subsequent overvoltage transient during generator build-up may cause a trip without a time delay. This hazard may be avoided by connecting the overvoltage circuit permanently to the terminals of the alternator and allowing residual voltage to cause reset.

It is within the scope of this invention to utilize output circuits having greater amplification than the one shown in FIGURE 2. For example, the size of the saturable reactor can be reduced if more amplification is provided by the output portion of the circuit to accommodate the correspondingly reduced characteristic output signals from the saturable reactor.

Those skilled in the art will appreciate that various other changes and modifications can be made in the preferred form of apparatus described herein without departing from the spirit and scope of the invention. The essential characteristics of the invention are defined in the appended claims.

We claim:

1. A static voltage sensing and overvoltage indicating circuit for an alternating current system comprising a saturable core, sensing means responsive to the voltage of succeeding half cycles of the same polarity of a phase of said system for changing the flux level of said core in one direction a first amount proportional to the average voltage of said phase, resetting means for changing the flux level of said core in an opposite direction a second predetermined amount substantially independent of the average voltage of said phase and having a predetermined relationship to said first amount that is substantially independent of the frequency of system voltage, said sensing means acting on said core once during each cycle of system voltage, and output means for providing a characteristic output signal when the flux level of said core is driven to saturation by said sensing means.

2. A static voltage sensing and overvoltage indicating circuit for an alternating current system comprising a saturable core, sensing means responsive to the voltage of succeeding half cycles of the same polarity of a phase of said system for changing the flux level of said core in one direction a first amount proportional to the average voltage of said phase, resetting means for changing the flux level of said core in an opposite direction a second predetermined amount substantially independent of the average voltage of said phase and having a predetermined relationship to said first amount that is substantially independent of the frequency of system voltage, said sensing and resetting means alternately and successively acting on said core once during each cycle of system voltage, and output means for providing a characteristic output signal when the flux level of said core is driven to saturation by said sensing means.

3. A voltage sensing and overvoltage indicating circuit for an alternating current system comprising a saturable core for providing a single flux path, a first winding on said core linking said flux path, rectifier means in circuit with said first winding and said system and adapted to supply said first winding with first voltage pulses proportional to the average voltage of half-cycles of system voltage of a polarity tending to change the flux level in said core in one direction, a second winding on said core linking said flux path, means in circuit with and adapted to supply said second winding with second voltage pulses having a predetermined average value substantially independent of system voltage in alternation with the voltage pulses supplied to said first winding and of a polarity tending to change the flux level in said core in the opposite direction, said first and second voltage pulses having a predetermined relationship that is substantially independent of the frequency of said system, output means in circuit with said first winding adapted to provide a characteristic output signal when the flux level of said core is driven into saturation by said first voltage pulses supplied to said first winding.

4. A voltage sensing and overvoltage indicating circuit for an alternating current system comprising a saturable core for providing a single flux path, a first winding on said core linking said flux path, first rectifier means in circuit with said first winding and said system and adapted to supply said first winding with first voltage pulses proportional to the average voltage of alternate half-cycles of one phase of system voltage of a polarity tending to change the flux level in said core in one direction, a second winding on said core linking said flux path, second rectifier means connected to said system and said second winding, and adapted to supply said second winding with second voltage pulses in alternation with first said voltage pulses supplied to said first winding and of a polarity tending to change the flux level in said core in the opposite direction, voltage limiting means in circuit with said second winding for limiting the amplitude of said second voltage pulses supplied to said second winding to a predetermined level substantially independent of the average voltage and frequency of said one phase, output means in circuit with said first winding adapted to provide a characteristic output signal when the flux level of said core is driven into saturation by said first voltage pulses supplied to said first winding.

5. A voltage sensing and overvoltage indicating circuit for an alternating current system comprising an input circuit including a pair of input terminals connected to said system, a saturable core providing a flux path, first and second windings on said core linking said flux path, first and second rectifier means and output impedance means, means connecting said first winding, said first rectifier means and said output impedance means in series between said input terminals, means connecting said second winding and said second rectifier means in series between said input terminals, said first and second rectifier means arranged with respect to each other to conduct opposite half-cycles of system voltage, means associated with said second winding to limit the amplitude of the half-cycles of voltage conducted therethrough to a predetermined level substantially independent of system voltage and frequency, an output circuit including a pair of output terminals each connected to one end of said output impedance means.

6. A voltage sensing and overvoltage indicating means for a polyphase alternating current system comprising the combination of a plurality of circuits according to claim 5, each of said circuits having their input terminals connected between neutral and one phase of said polyphase system, "OR" circuit means interconnecting said output terminals of said circuits to provide a single output, transistor means having an emitter and collector comprising the output circuit of said transistor and a base connected to said single output of said "OR" circuit for controlling said output circuit of said transistor, a source of D.C. potential and an output relay connected to said output circuit of said transistor and connected to and energizable by said D.C. source, said output circuit of said transistor being arranged to control the energization of said output relay by said D.C. source.

7. A voltage sensing and overvoltage indicating circuit for a polyphase alternating current system comprising a sensing circuit associated with each phase of said polyphase system, each of said sensing circuits comprising a saturable core, sensing means responsive to the voltage of succeeding half-cycles of the same polarity of its associated phase for changing the flux level of said core in one direction a first amount proportional to the average voltage of its associated phase, resetting means for changing the flux level of said core in an opposite direction a second predetermined amount substantially independent of the average voltage of its associated phase and having a predetermined relationship to said first amount that is substantially independent of system frequency, said sensing means acting on said core once during each cycle of its associated phase voltage, and output means for providing a characteristic output signal when the flux level of said core is driven to saturation by said sensing means, "OR" circuit means interconnecting said output means of said sensing circuits to provide a single output, transistor means having an emitter and collector comprising the output circuit of said transistor and a base connected to said single output of said "OR" circuit for controlling said output circuit of said transistor, a source of D.C. potential and an output relay connected to output circuit of said transistor and connected to and energizable by said D.C. source, said output circuit of said transistor being arranged to control the energization of said output relay by said D.C. source.

References Cited in the file of this patent
UNITED STATES PATENTS

| | | |
|---|---|---|
| 2,816,260 | Scorgie | Dec. 10, 1957 |
| 2,836,770 | Saios | May 27, 1958 |
| 2,856,584 | Stratton | Oct. 14, 1958 |
| 2,994,831 | Schohan | Aug. 1, 1961 |